United States Patent
Khafagy et al.

(10) Patent No.: US 10,030,626 B2
(45) Date of Patent: Jul. 24, 2018

(54) SYSTEM AND METHOD FOR CONTROLLING A STOP-START VEHICLE AFTER JUMP START OR BATTERY REPLACEMENT

(71) Applicant: FORD GLOBAL TECHNOLOGIES, LLC, Dearborn, MI (US)

(72) Inventors: Hafiz Shafeek Khafagy, Dearborn, MI (US); Hanyang B. Chen, Canton, MI (US); David W. Linden, Ann Arbor, MI (US); Michael J. Irby, Monroe, MI (US); Karen Price, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 15/058,328

(22) Filed: Mar. 2, 2016

(65) Prior Publication Data
US 2017/0254309 A1 Sep. 7, 2017

(51) Int. Cl.
*F02N 11/04* (2006.01)
*F02N 11/08* (2006.01)

(52) U.S. Cl.
CPC ........ *F02N 11/084* (2013.01); *F02N 11/0825* (2013.01); *F02N 11/04* (2013.01); *F02N 11/0803* (2013.01); *F02N 2200/06* (2013.01); *F02N 2200/061* (2013.01)

(58) Field of Classification Search
CPC .................. F02N 11/084; F02N 2200/06
USPC .......................................... 701/113
See application file for complete search history.

(56) References Cited

U.S. PATENT DOCUMENTS

| | | | |
|---|---|---|---|
| 2012/0077640 A1* | 3/2012 | Saito | F02D 17/02 477/183 |
| 2014/0081561 A1 | 3/2014 | Be et al. | |
| 2014/0091739 A1* | 4/2014 | Sato | B60L 11/1879 318/139 |
| 2014/0095056 A1 | 4/2014 | Rademacher et al. | |
| 2014/0236459 A1* | 8/2014 | Boesch | F02D 29/02 701/112 |
| 2015/0019079 A1 | 1/2015 | Romanato | |
| 2015/0210265 A1 | 7/2015 | Rademacher et al. | |
| 2016/0178700 A1* | 6/2016 | Kawazu | G01R 31/3606 73/114.61 |
| 2017/0089314 A1* | 3/2017 | Books | F02N 11/084 |

FOREIGN PATENT DOCUMENTS

JP 2015059511 A * 3/2015

* cited by examiner

Primary Examiner — Joseph Dallo
Assistant Examiner — Yi-Kai Wang
(74) Attorney, Agent, or Firm — David B. Kelley; Brooks Kushman P.C.

(57) ABSTRACT

A stop-start vehicle and a method of controlling a stop-start vehicle include a controller configured to, in response to a power-reset event, inhibit an engine auto-stop function. The controller is additionally configured to, in response to a successful key start event subsequent the power-reset event, cease the inhibiting of the engine auto-stop function.

16 Claims, 3 Drawing Sheets

SYSTEM AND METHOD FOR CONTROLLING A STOP-START VEHICLE AFTER JUMP START OR BATTERY REPLACEMENT

TECHNICAL FIELD

The present disclosure relates to automotive vehicles having engines equipped to auto-stop and auto-start.

BACKGROUND

Stop/start vehicles may be equipped with an engine auto-stop feature. This feature shuts down the engine during certain periods of vehicle operation in order to conserve fuel. For example, the auto-stop feature may be engaged when the vehicle is stopped rather than permitting the engine to idle. The engine may be restarted when the driver releases the brake or actuates the accelerator.

SUMMARY

A method of controlling a stop-start vehicle according to the present disclosure includes, in response to a power-reset event, inhibiting an engine auto-stop function. The method additionally includes, in response to a successful key start event subsequent the power-reset event, ceasing the inhibiting of the engine auto-stop function.

According to a first embodiment of the method, the power-reset event includes a jump-start of the stop-start vehicle.

According to a second embodiment of the method, the power-reset event includes a battery replacement event of the stop-start vehicle.

According to a third embodiment of the method, the successful key start event is a first key start event subsequent the power-reset event. The successful key start event may also be a first key start event without an external charger connected to the vehicle.

According to a fourth embodiment, the ceasing the inhibiting of the engine auto-stop function is in further response to a vehicle speed exceeding a calibrated threshold subsequent the successful key-start event.

A vehicle according to the present disclosure includes an engine. The engine is configured to automatically stop in response to an auto-stop request and automatically start in response to an auto-start request. The vehicle additionally includes a controller. The controller is configured to selectively issue auto-stop and auto-start requests to the engine. The controller is additionally configured to, in response to a power-reset event, discontinue issuance of auto-stop requests. The controller is further configured to, in response to a successful key-start event subsequent the power-reset event, resume issuance of auto-stop requests.

According to a first embodiment of the vehicle, the power-reset event includes a jump-start of the stop-start vehicle.

According to a second embodiment of the vehicle, the power-reset event includes a battery replacement event of the stop-start vehicle.

According to a third embodiment of the vehicle, the successful key start event is a first key start event subsequent the power-reset event.

According to a fourth embodiment of the vehicle, the controller is configured to resume issuance of auto-stop requests in further response to a vehicle speed exceeding a calibrated threshold subsequent the successful key-start event.

A stop-start control system for a vehicle according to the present disclosure includes a controller. The controller is configured to selectively control an engine according to a first mode and a second mode. In the first mode stop-start is available, and in the second mode stop-start is unavailable. The controller is additionally configured to, in response to a power-reset event, control the engine in the second mode. The controller is further configured to, in response to a successful key-start event subsequent the power-reset event, control the engine in the first mode.

According to a first embodiment of the stop-start control system, the power-reset event includes a jump-start of the stop-start vehicle.

According to a second embodiment of the stop-start control system, the power-reset event includes a battery replacement event of the stop-start vehicle.

According to a third embodiment of the stop-start control system, the successful key start event is a first key start event subsequent the power-reset event.

According to a fourth embodiment of the stop-start control system, the controller is configured to control the engine in the first mode in further response to a vehicle speed exceeding a calibrated threshold subsequent the successful key-start event.

Embodiments according to the present disclosure provide a number of advantages. For example, embodiments according to the present disclosure provide a system and method for ensuring that a vehicle battery is capable of supporting an auto-start function before permitting an auto-stop, thus providing increased system reliability and increasing customer satisfaction.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling auto-stop and auto-start functions. The stop/start system may auto-stop the engine when the vehicle is stopped and the engine is not required for propulsion or other purposes. At a later time, the stop/start system may auto-start the engine when required for propulsion or other purposes. By disabling the engine when possible, overall fuel consumption is reduced. Unlike true hybrid vehicles, stop/start vehicles are not capable of pure electric propulsion. Furthermore unlike true hybrid vehicles, stop/start vehicles are not equipped with a traction battery. Rather they merely include a conventional starting, lighting, and ignition (SLI) battery.

Controllers may initiate an auto-stop or auto-start of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine auto-stop, the controllers may issue a command to begin the process to start the engine, thus enabling the alternator or integrated starter generator to provide electric current to the electrical loads.

Figure 1:
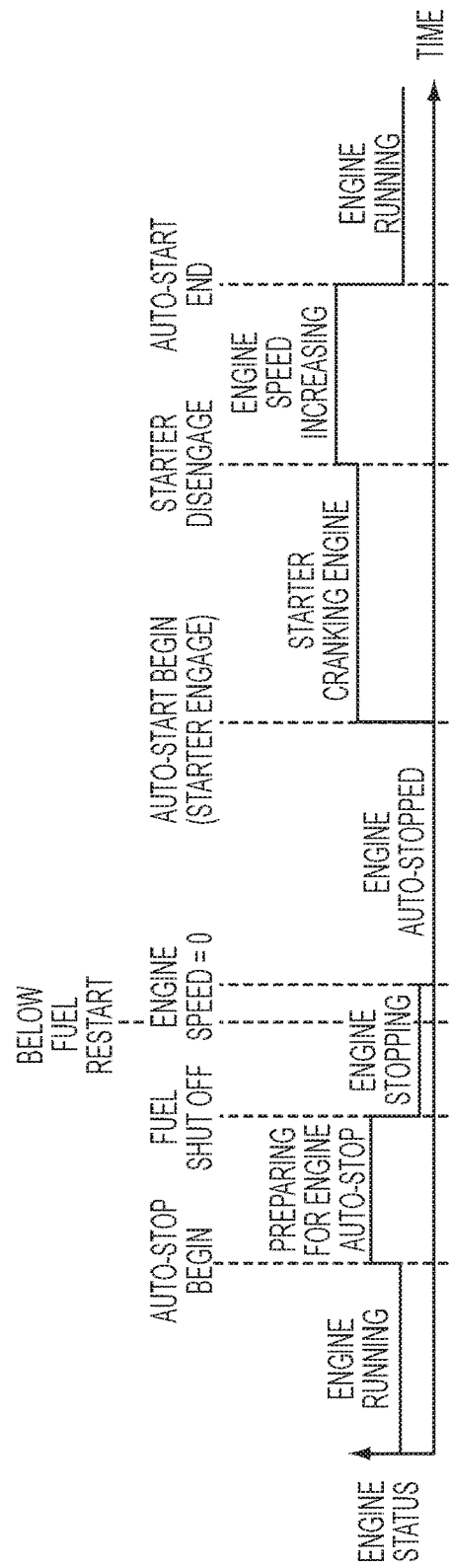
FIG. 1 is a plot illustrating engine status during an auto-stop.

With reference to FIG. 1, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

Because stop-start vehicles have increased operation time with accessories drawing on the battery and the engine off relative to conventional vehicles, it may be particularly helpful to assess battery deterioration in stop-start vehicles. Battery performance in stop-start vehicles is generally improved as internal battery resistance decreases and as battery capacity increases. Thus, battery health and charge capacity evaluation is important in stop-start vehicles in order both to ensure that the battery is capable of supporting an engine auto-stop and subsequent auto-start, and also to minimize the amount of operating time with auto-stops inhibited, i.e. to maximize stop-start availability. Various parameters may be evaluated to assess battery capacity deterioration from age or use, including battery voltage, battery state of charge (SOC) and a current battery state of health.

Battery health parameters are typically captured by a controller, such as a Battery Management System (BMS), by measuring battery voltage and current during at least one engine cranking event. These measurements may be stored in non-volatile system memory, aggregated across a plurality of cranking events, and the aggregated measurements evaluated to determine the various battery health parameters. Engine auto-stop behavior may be inhibited for a given drive cycle if at least one battery health parameter measured by the BMS during a cranking event, or an aggregated measurement of a health parameter across multiple cranking events, falls below a threshold.

While the above process may provide satisfactory evaluations under typical operating conditions, in some circumstances the results may be inaccurate.

After a battery power reset event, the typical battery health metrics may not accurately reflect the capabilities of the vehicle battery. Battery power reset events may occur when, for example, a vehicle battery is disconnected and/or replaced. In addition, a battery power reset event may occur when battery health deteriorates such that battery voltage is below a minimum threshold, e.g. 3V. Likewise, a battery power reset event may occur when battery charge drops below a minimum threshold, necessitating a jump start. After a battery power reset event, stored battery health parameters may be reset to a default initial value. The default value may be chosen based on an assumption that a battery replacement will result in a healthy battery being used, and thus correspond to a relatively high state of health. Until a sufficient number of measurements have been made to replace the default values with measured values, the stored values may indicate that that the battery has sufficient health to support auto-stops based on the presence of the default values.

While this produces satisfactory results if a new battery is indeed used, in some instances an operator may replace an old battery with a second old battery, or temporarily disconnect and subsequently reconnect an old battery. In such instances, the stored values may incorrectly indicate that the battery has sufficient health to support auto-stops.

Furthermore, during a jump start, the typical battery health metrics may not accurately reflect the capabilities of the vehicle battery. Instead of accurately measuring measured voltage and current of the battery, the measurements may capture the voltage and current of the charging device. As a result, measured parameters may incorrectly indicate that the battery has sufficient health to support auto-stops.

In the above scenarios, operation of the vehicle with auto-stop enabled may result in the engine being auto-stopped with insufficient battery charge to subsequently auto-start the engine. Such behavior may reduce customer satisfaction.

Consequently, an improved stop-start control to account for battery power reset events is desirable.

Figure 2:
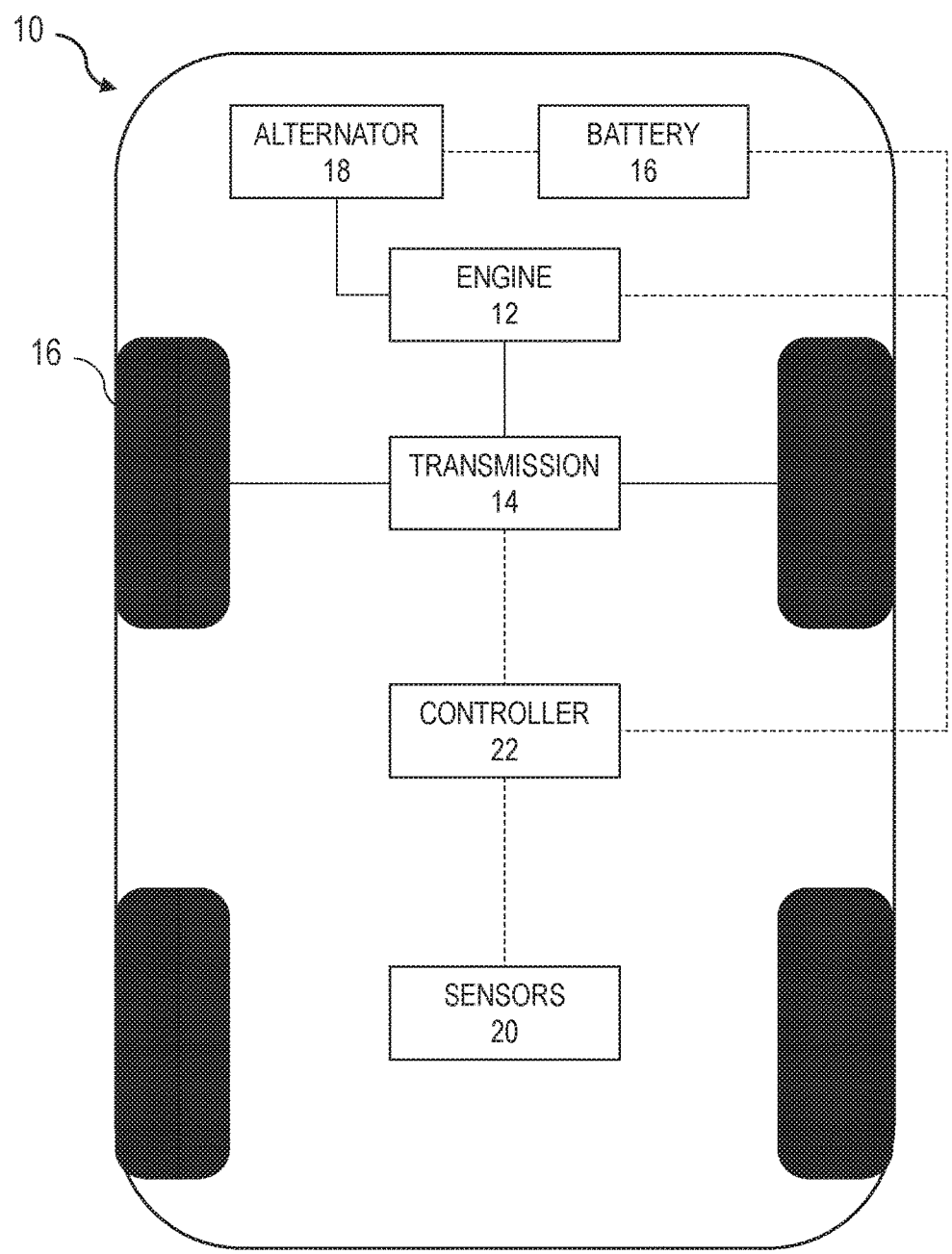
FIG. 2 is a block diagram of a stop/start vehicle.

With reference to FIG. 2, a schematic representation of a vehicle 10 according to the present disclosure is shown.

The vehicle 10 includes an engine 12, which may be an internal combustion engine. The engine 12 is configured to auto-stop and auto-start in response to various commands, as will be discussed in further detail below. The engine 12 is coupled to a transmission 14. The transmission 14 is configured to transmit power from the engine 12 to vehicle traction wheels 16 according to a plurality of speed and torque ratios. The transmission 14 may be an automatic transmission, manual transmission, continuously variable transmission (CVT), or other appropriate transmission mechanism.

The vehicle 10 additionally includes a battery 16. The battery 16 may be an SLI (starting, lighting, ignition) battery. Such batteries are generally 12-volt batteries, and are configured to supply power to various systems such as a starter motor, vehicle lights, an ignition system, and other features as will be discussed below. However, other embodiments are contemplated having higher voltage and/or higher capacity than typical SLI batteries. The engine is configured to, when running, charge the battery 16 via an alternator 18.

The vehicle 10 further includes various sensors 20. The sensors 20 preferably include a speed sensor, an accelerator pedal sensor, and a brake pedal sensor. The sensors 20 may also include additional sensors as appropriate.

The engine 12, transmission 14, battery 16, and sensors 20 are all in communication with or under the control of at least one controller 22. While illustrated as one controller, the controller 22 may include a plurality of control modules, such as a battery control module (BCM), engine control module (ECM), and transmission control module (TCM), each of which may include separate controllers. The controller 22 may be part of a larger control system and may be controlled by various other controllers throughout the vehicle 10, such as a vehicle system controller (VSC). It should therefore be understood that the controller 22 and one or more other controllers may collectively be referred to as a "controller" that controls various systems in response to various signals, as will be discussed in further detail below. The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 22 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The controller 22 may issue auto-stop commands and auto-start commands to the engine 12 during vehicle operation. The controller 22 may, for example, be provided with a nominal auto-stop/start logic that issues auto-stop commands and auto-start commands—to achieve, among other things, stages similar to that described with reference to FIG. 1—based on signals from the sensors 20 indicating vehicle speed, driver acceleration request, driver braking request, and state of charge (SOC) of the battery 16. In short, the engine 12 will be shut down in response to an auto-stop command and will be restarted in response to an auto-start command.

Figure 3:
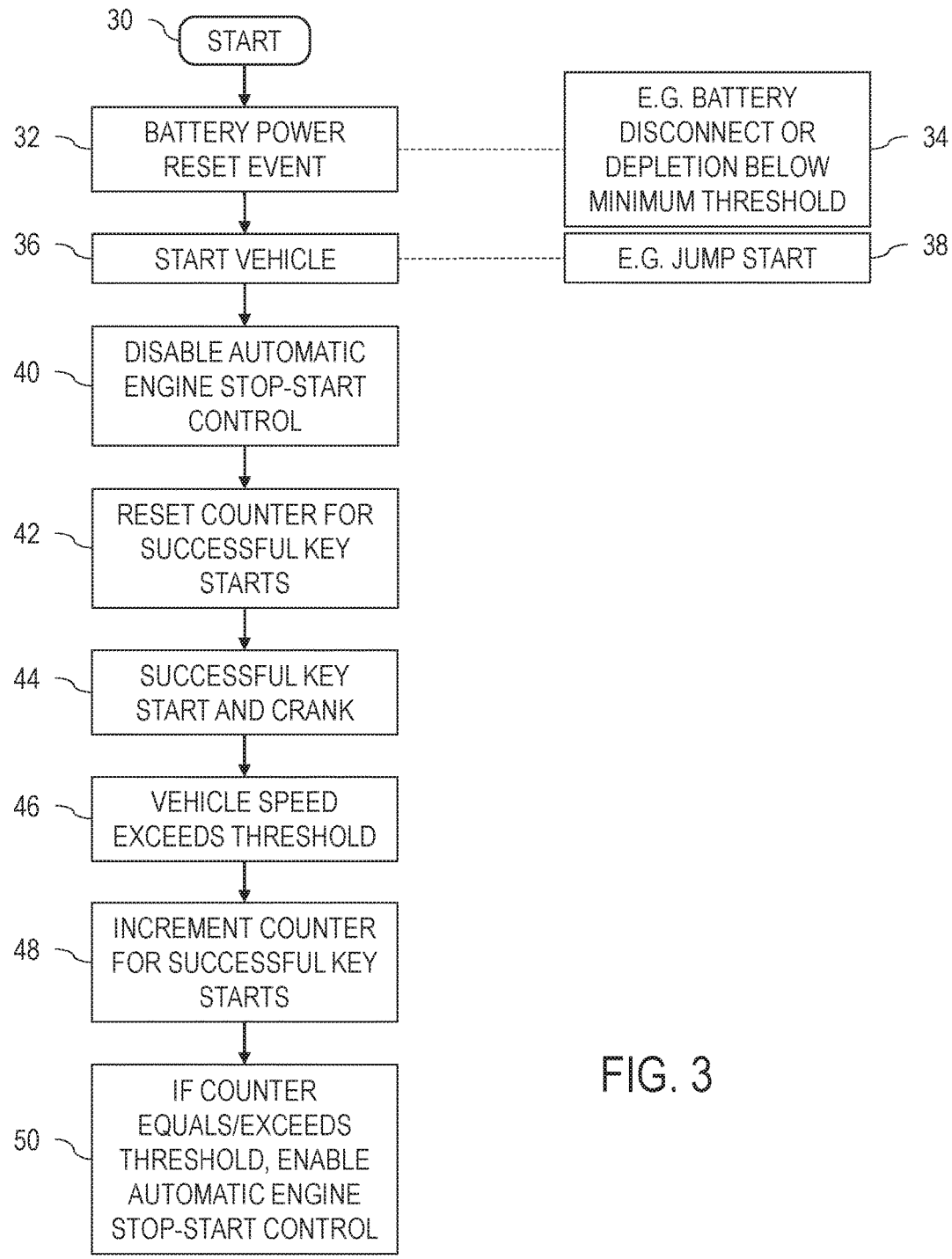
FIG. 3 is a flowchart illustrating an algorithm for controlling a start/stop vehicle.

Referring now to FIG. 3, a method of controlling a vehicle according to the present disclosure is shown in flowchart form. The algorithm may be performed, for example, by the controller 22. The algorithm begins at block 30.

A battery power reset event occurs, as illustrated at block 32. Examples of a battery power reset event include a battery disconnection, or a battery depletion below a minimum threshold, as illustrated at block 34. Upon a first power-up after a battery reset event, a memory flag BatteryReset is set to TRUE, indicating that a battery power reset event has occurred.

The vehicle is then started, as illustrated at block 36. This may include a jump start, if necessary, as illustrated at block 38. Upon this initial start, a memory flag NormalCrankFlag is set to FALSE, indicating that the crank was an atypical crank event due to the battery reset event and/or jump start.

Automatic engine stop-start control is then disabled, as illustrated at block 40. This may be include setting a memory flag PowerReset$_{13}$DisableSS to TRUE. While stop-start control is disabled, engine auto-stop commands will not be issued. The disabling of stop-start control applies to all types of stop-start behavior, including static stop-start control which may auto-stop the engine at low vehicle speeds with a brake pedal applied, rolling stop-start control which may auto-stop the engine at relatively high speed with the brake pedal applied, and sailing stop-start control which may auto-stop the engine at relatively high speed with the brake pedal released. In addition, the disabling of stop-start control applies to engine stop-start behavior at any voltage range.

A counter for successful "key start" events is reset, as illustrated at block 42. This may include setting a flag ManualKeyStartCount equal to 0. Here, key start refers to a manual start in response to a driver input. The driver input may include turning a key, pressing a button in the vehicle, remotely requesting a vehicle start, or other appropriate inputs.

A subsequent successful key start and engine crank event occurs, as illustrated at block 44. In response to the successful key start, the memory flag NormalCrankFlag is set to TRUE.

When vehicle speed exceeds a threshold, as illustrated at block 46, with the flag Normal CrankFlag set to TRUE, the counter for successful key starts ManualKeyStartCount is incremented by one, as illustrated at block 48.

If the counter ManualKeyStartCount equals or exceeds a threshold, then automatic stop-start control is enabled, as illustrated at block 50. This may be include setting the memory flag PowerReset$_{13}$DisableSS to FALSE. The threshold may be equal to one, or may be set to a higher value if desired.

Thus, in response to a battery power reset event, engine auto-stops may be inhibited until the engine is successfully cranked normally and the vehicle has exceeded a threshold speed, thus ensuring that the battery is capable of supporting engine starts and normal vehicle operation.

As may be seen, embodiments according to the present disclosure provide a system and method for ensuring that a vehicle battery is capable of supporting an auto-start function before permitting an auto-stop, thus providing increased system reliability and increasing customer satisfaction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

What is claimed is:

1. A method of controlling a stop-start vehicle comprising:
    in response to a power-reset event, inhibiting an engine auto-stop function until a subsequent successful key start event; and
    in response to the successful key start event subsequent the power-reset event, ceasing the inhibiting of the engine auto-stop function.

2. The method of claim 1, wherein the power-reset event includes a jump-start of the stop-start vehicle.

3. The method of claim 1, wherein the power-reset event includes a battery replacement event of the stop-start vehicle.

4. The method of claim 1, wherein the successful key start event is a first key start event subsequent the power-reset event.

5. The method of claim 1, wherein the successful key start event is a first key start event without an external charger connected to the vehicle.

6. The method of claim 1, wherein the ceasing the inhibiting of the engine auto-stop function is in further response to a vehicle speed exceeding a calibrated threshold subsequent the successful key-start event.

7. A vehicle comprising:
    an engine configured to automatically stop in response to an auto-stop request and automatically start in response to an auto-start request; and
    a controller configured to selectively issue auto-stop and auto-start requests to the engine, the controller being further configured to, in response to a power-reset event, discontinue issuance of auto-stop requests and, in response to a successful key-start event subsequent the power-reset event, resume issuance of auto-stop requests.

8. The vehicle of claim 7, wherein the power-reset event includes a jump-start of the stop-start vehicle.

9. The vehicle of claim 7, further comprising a battery, wherein the power-reset event includes a battery replacement event.

10. The vehicle of claim 7, wherein the successful key start event is a first key start event subsequent the power reset event.

11. The vehicle of claim 7, wherein the controller is configured to resume issuance of auto-stop requests in further response to a vehicle speed exceeding a calibrated threshold subsequent the successful key-start event.

12. A stop-start control system for a vehicle comprising:
    a controller configured to selectively control an engine according to a first mode in which stop-start is available and a second mode in which stop-start is unavailable, the controller being further configured to, in response to a power-reset event, control the engine in the second mode and, in response to a successful key-start event subsequent the power-reset event, control the engine in the first mode.

13. The stop-start control system of claim 12, wherein the power-reset event includes a jump-start of the stop-start vehicle.

14. The stop-start control system of claim 12, wherein the power-reset event includes a battery replacement event.

15. The stop-start control system of claim 12, wherein the successful key start event is a first key start event subsequent the power reset event.

16. The stop-start control system of claim 12, wherein the controller is configured to control the engine in the first mode in further response to a vehicle speed exceeding a calibrated threshold subsequent the successful key-start event.

* * * * *